(12) United States Patent
Pereira Filho

(10) Patent No.: US 9,599,337 B2
(45) Date of Patent: Mar. 21, 2017

(54) METHOD FOR TREATING SOLID WASTE BASED ON A GRADIENT COMPOSED OF TWO DISTINCT THERMAL SOURCES

(75) Inventor: Alberto Carlos Pereira Filho, Sao Paulo (BR)

(73) Assignee: Solum Ambiental E Equipamentos Electronmecanicos LTDA (BR)

( * ) Notice: Subject to any disclaimer, the term of this patent is extended or adjusted under 35 U.S.C. 154(b) by 699 days.

(21) Appl. No.: 13/879,215

(22) PCT Filed: Apr. 4, 2012

(86) PCT No.: PCT/BR2012/000094
§ 371 (c)(1),
(2), (4) Date: Sep. 6, 2013

(87) PCT Pub. No.: WO2013/026110
PCT Pub. Date: Feb. 28, 2013

(65) Prior Publication Data
US 2013/0341176 A1  Dec. 26, 2013

(30) Foreign Application Priority Data
Aug. 25, 2011  (BR) ............................... PI-11042192

(51) Int. Cl.
*F23G 5/00* (2006.01)
*B09B 3/00* (2006.01)
(Continued)

(52) U.S. Cl.
CPC .................. *F23G 5/00* (2013.01); *B09B 3/00* (2013.01); *B09B 3/0083* (2013.01); *C10B 53/00* (2013.01);
(Continued)

(58) Field of Classification Search
CPC ...... F23G 5/273; F23G 5/276; F23G 2201/30; F23G 5/00; F23G 5/85; F23G 5/18;
(Continued)

(56) References Cited

U.S. PATENT DOCUMENTS 3,841,239 A * 10/1974 Nakamura ............... C10B 49/14
110/250
3,856,487 A * 12/1974 Perez ..................... B01D 47/06
96/240
(Continued)

FOREIGN PATENT DOCUMENTS

DE         4311769      10/1994
UA          24032       6/2007
(Continued)

OTHER PUBLICATIONS

International Search Report in Application PCT/BR2012/000094, NPI, Jun. 4, 2012.

*Primary Examiner* — Jill Warden

(57) ABSTRACT

A process and system for the treatment of solid waste based on a temperature gradient generated by two distinct thermal sources, notably of a sequenced technological assembly, is able to process solid waste of any class, which operates through a reactor (1) having two chambers (2 and 3), each having a thermal source (4 and 5), where a thermal gradient is generated, followed by a heat exchanger (6) where gases are abruptly cooled and taken to a neutralizing tank (7), for then being directed to an activated charcoal filter (8), due to the action of a blower (9), before finally entering a burner (10) that works under electrical discharges, passing through a catalytic converter (11) and chimney (12) where it is extravasated into the completely inert atmosphere.

3 Claims, 1 Drawing Sheet

(51) Int. Cl.

| | |
|---|---|
| *F23G 5/027* | (2006.01) |
| *F23G 5/08* | (2006.01) |
| *F23G 5/18* | (2006.01) |
| *F23G 5/50* | (2006.01) |
| *F23G 7/07* | (2006.01) |
| *F23G 7/06* | (2006.01) |
| *C10K 1/00* | (2006.01) |
| *C10K 1/02* | (2006.01) |
| *C10K 1/04* | (2006.01) |
| *C10K 1/12* | (2006.01) |
| *C10B 53/00* | (2006.01) |

(52) U.S. Cl.
CPC .............. *C10K 1/003* (2013.01); *C10K 1/024* (2013.01); *C10K 1/04* (2013.01); *C10K 1/12* (2013.01); *F23G 5/006* (2013.01); *F23G 5/0276* (2013.01); *F23G 5/085* (2013.01); *F23G 5/18* (2013.01); *F23G 5/50* (2013.01); *F23G 7/063* (2013.01); *F23G 7/07* (2013.01); *F23G 2201/301* (2013.01); *F23G 2201/40* (2013.01); *F23G 2202/10* (2013.01); *F23G 2202/104* (2013.01); *F23G 2202/70* (2013.01)

(58) Field of Classification Search
CPC ..... F23G 5/50; F23G 7/07; F23G 7/63; B09B 3/00; B09B 3/083; C10K 1/04; C10K 1/03; C10K 1/24; C10K 1/12; C10B 53/00; C10J 2300/1276
USPC ............... 261/126, 121.1; 588/321, 400; 422/184.1, 630; 373/144; 110/229; 48/209, 197 R, 65; 201/19
See application file for complete search history.

(56) References Cited

U.S. PATENT DOCUMENTS

| | | | | |
|---|---|---|---|---|
| 3,996,044 | A * | 12/1976 | Petritsch | C10B 19/00 48/209 |
| 4,831,944 | A * | 5/1989 | Durand | C10B 19/00 48/209 |
| 7,642,394 | B1 * | 1/2010 | Carle | B09B 3/00 201/25 |
| 2007/0251393 | A1 * | 11/2007 | Pope | B01D 47/06 96/329 |
| 2011/0296758 | A1 * | 12/2011 | Lersch | F23G 5/0276 48/197 R |

FOREIGN PATENT DOCUMENTS

| | | |
|---|---|---|
| WO | WO 9749641 | 12/1997 |
| WO | WO 0056407 | 9/2000 |

* cited by examiner

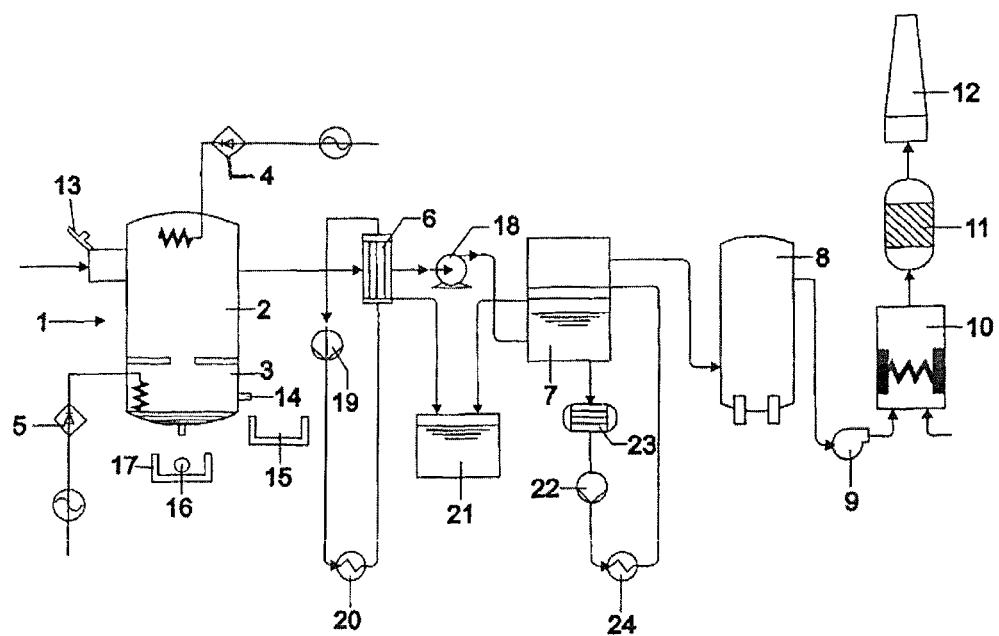

METHOD FOR TREATING SOLID WASTE BASED ON A GRADIENT COMPOSED OF TWO DISTINCT THERMAL SOURCES

TECHNICAL FIELD

The present invention relates to a novel "Process for the treatment of solid waste based on gradient composed of two distinct thermal sources", especially of a compact process to be applied to the field of solid waste destruction, including the class I ones, effected by pyrolysis resulting from the thermal gradient in the reactor that works in negative pressure, fueled by thermal radiation or induction sources, so that the solid waste is rendered inert through its fusion, not originating complex molecules like furans and dioxins, with minimal production of effluent gases. Such process can be used in the industry, hospitals, ports, airports, ships, oil platforms, islands, condominiums and any place having the need of completely destroying garbage, in an effective and safe way.

BACKGROUND INFORMATION

The environmental law requires compliance with standards for the proper disposal of solid waste of all classes in a way to avoid the eminent environmental collapse in case severe measures are not taken and implemented.

In this context, various directions and strands are envisioned, with emphasis on landfills, composting and incineration more relevant with this patent application.

Basically, incineration is based on the burning of waste/residue being a technique acceptable up to a certain point, but it demands high investments explained by the need for strict control of the emission of polluting gases generated by burning, mainly when it comes to toxic waste. A priori, incinerators do not solve the problem, only converting toxic waste to other forms, some of them with greater toxicity than the original material.

The current state of the art anticipates some patent documents that deal with the treatment of solid waste, such as IP 0104060-0 "Process of Incineration of Emission Products from the Production of Industrial Waste'. It provides a novel process for controlling the temperature of incineration in response to changes in the emission products and waste streams, results in excellent and reliable control of the incineration process and resulting incineration emissions. As a result, the capital and operation costs are significantly reduced.

IP 0601690-1 "Integrated System for Treatment and Disposal of Solid Wastes" which aims to integrate their collection, treatment and disposal processes; eliminate the generation of environmental liabilities; increasing efficiency and effectiveness and the amount of re-usable products during and after the disposal route. It involves receiving the waste at the treatment plant; pre-selecting said waste; crushing the organic material; accelerated composting; incineration; treatment of gas, ash and liquid effluent; and generating raw materials and products reusable by society.

IP 0803036-7 "Process for the Treatment of Solid Waste Based on Reactor having Plasma Technology", presents a traditional configuration of the assembly arrangement consisting of: combustor (furnace, combustion chamber and reactor or burner), post-combustor, gas treatment and exhaustion (chimney). However, this process is distinguished from the others by its original features, the most important being the employment of reactor having the claimed plasma technology.

The above documents anticipate systems/equipment of substantial size, even when comparing plasma models, and in the first two mentioned, which work with combustion, there is excessive generation of gases, which explains the large dimensions and high investment in the not always effective filtration system.

SUMMARY

Aware of the state of the art and of its shortcomings and limitations, the inventor, person inclined to the present subject matter, after research and studies, created said "PROCESS FOR THE TREATMENT OF SOLID WASTE BASED ON GRADIENT COMPOSED OF TWO DISTINCT THERMAL SOURCES", which refers to an automatically operated sequenced technological assembly capable of processing solid waste of any class, based on thermal gradient generated by two reactive and/or inductive thermal sources, obviating the need for combustion of the same or auxiliary equipment, as well as the presence of air. The temperature inside the two twinned chamber thermal reactors varies between 900° C. at the top part and 1600° C. at the bottom, which generates the gradient, liquefying completely all solid, even ferrous or inert materials, such as sand, as well as infectious, pathological, organochlorinated materials, having as solid by-products a ceramic matrix of equally inert commercial application in the bottom of the reactor. The process is of the pyrolysis type and operates in negative atmosphere, not allowing gaseous leaks, therefore, in the absence of oxygen added to the high temperature, not providing the formation of dioxins or furans. The gases formed in the interior of the reactor are sucked and abruptly cooled in a heat exchanger, of the quench type, for being subsequently treated, with separation of oil/water, and neutralized in a particularly alkaline dipping tank. Activated charcoal-based filters ensure that the levels of emissions meet the environmental standards. At the end of the process, a small burner, based on electrical discharge technology, is used to burn the residual fuel gases, such as the $H_2$ and CO, and for the breaking of complex molecules. For safety purposes, a combustion catalyst is attached at the output of the process and the gases are directed to the chimney.

In short, the invention claimed herein presents as the compelling general advantages:

Features—made possible by compact devices that operate automatically, wherein any person will be able to feed the reactor through his door, the garbage to be treated does not need to be selective;

Logistics—convenience and practicality in the treatment of garbage, immediately and safely;

Environmental—treats the whole material/waste garbage regardless of classification taking into account all environmental standards; does not produce ash; reduced and nontoxic emission of gases;

Cost-effective—low cost is well below the practiced when hiring third-party companies; the system automatically allows minimum consumption of electric energy in pyrolysis; and Safety—the user has absolute control of garbage/waste destination, not incurring the risk of punishment due to irregular action from a hired third party company.

BRIEF DESCRIPTION OF THE DRAWINGS

These and other features and advantages of the present invention will be better understood by reading the following detailed description, taken together with the drawings wherein:

FIG. 1 is a diagrammatic flowchart of the process for the treatment of solid waste based on gradient comprising two thermal sources in accordance with the teachings of the invention.

DETAILED DESCRIPTION OF THE PREFERRED EMBODIMENTS

The "PROCESS FOR THE TREATMENT OF SOLID WASTE BASED ON GRADIENT COMPOSED OF TWO DISTINCT THERMAL SOURCES", object of this patent of invention application, refers to a sequenced technological assembly capable of processing solid waste of any class, which operates by means of a reactor (1) having two chambers (2 and 3), each having a heat source (4 and 5), where a thermal gradient is generated, followed by a heat exchanger (6) where the gases are abruptly cooled and taken to a neutralizing tank (7), for then being directed to an activated charcoal filter (8) due to the action of a blower (9), for finally entering a burner (10) which works under electrical discharges, passing through a catalytic converter (11) and chimney (12) where it is filtered out to the completely inert atmosphere.

More particularly, the process claimed herein according to the FIGURE flow chart consists in the principle of use of a thermal gradient. In the primary chamber (2), after the feeding of the residue through the door (13), the material to be processed is directed to the center of the reactor (1), wherein in the primary chamber (2) it is subjected to the effect of a moderate radiation, having maximum temperature of 1200° C., being able to operate at 900° C., as a function of the residue being processed and the electric energy savings. In this way, the solid residue at 1200° C. in substantial absence of air, undergoes pyrolysis with formation of small quantity of gases, and the ash generated in this step is directed by gravity to the second chamber (3).

Chamber (2) is assisted by a heat source (4) capable to generate heat in the range of 900° C. to 1200° C., therefore having calculated power, which optimizes and ensures the complete pyrolysis of non-inert waste, resulting in the formation of ash, gas and heated inert materials. In the fusion chamber (3), also assisted by the heat source (5), ash and inert materials coming from the primary chamber (1) are liquefied at temperatures in the range of 1400° C.-1600° C., having automatically controlled power, wherein the heat source (5) is adjusted on as a function of the material being processed. The liquefaction product is leaked through an opening (14) in the reactor (1), collected in a crucible (15), cooled and vitrified. This by-product has inert properties regarding toxicity. Having presence of ferrous metals in the garbage, such as nickel, chromium, iron and others, they it also be liquefied and, due to its greater density, a second phase of liquefied material will form at the bottom of the reactor (1), which will be leaked to the crucible (17) through the bottom opening (16).

In turn, the gases resulting from pyrolysis are sucked by a sucker (18), which causes the reactor (1) to work at negative pressure and are directed to a heat exchanger (6) where they suffer sudden cooling by water circulating via pump (19) and cooled by air in external environment with the aid of radiator (20). In the heat exchanger (6), there is condensation of oil and water, which are carried by gravity to a tank (21). Once cooled, these gases are injected into an alkaline water tank (7) concentrated with sodium hydroxide for greater cooling, Ph neutralization and treatment.

The water in this tank (7) is constantly recirculated with the aid of a pump (22) and filter (23) assembly for then being cooled in the radiator (24) and returned to the tank (7) itself. On the other hand, the effluent gases of tank (7) are sucked by blower (9) to an activated charcoal filter (8), which promotes the complete reduction of particulate matter and complex molecules and molecules that harmful to the environment, such as dioxins and furans.

Upon passing through the activated charcoal filter (8), they are sent to a combustor (10) where the fuel gases are oxidized. The combustor (10) has an electrical discharge generator to assist in the combustion, ensuring complete burning of such gases in the presence of atmospheric air. Finally, after burned, the gases pass through a catalytic converter (11) which ensures maximum reduction of NOx, CO and other gases, being released to the atmosphere through a chimney (12).

Optionally, for cost-effective reasons, the process can happen without the fusion of inert ashes and solid, so that the heat source (5) is not engaged. In this case, ash and inert products will be byproducts of the process.

Modifications and substitutions by one of ordinary skill in the art are considered to be within the scope of the present invention, which is not to be limited except by the following claims.

The invention claimed is:

1. A process for the treatment of solid waste provided to a processing system, said processing system comprising a reactor (1) configured to operate at a negative pressure, and having first and second chambers (2 and 3) namely a pyrolysis chamber (2) and a fusion chamber (3) for ash and inert material, respectively, said reactor (1) configured to achieve a temperature gradient of between 900° C. to 1600° C. between said first and second chambers (2, 3), said temperature gradient provided by first and second power controlled thermal sources (4 and 5), said first power controlled thermal source (4) coupled to said pyrolysis chamber (2) and serving as a controlled thermal source for said pyrolysis chamber (2), and said second power controlled thermal source (5) coupled to said fusion chamber (3) and serving as a controlled thermal source for said fusion chamber (3), said process for the treatment of said solid waste provided to said processing system comprising:

initiating the treatment of solid waste by said processing system, said step of initiating the treatment of solid waste comprising providing the solid waste to the pyrolysis chamber (2) of said primary reactor (1) in substantial absence of air;

subjecting said solid waste to be treated in said pyrolysis chamber (2) to a first temperature established by said first power controlled thermal source (4), said solid waste treated in said pyrolysis chamber (2) at a first temperature undergoing pyrolysis which causes formation of a quantity of gases and ash;

establishing a temperature gradient in said primary reactor (1) by establishing a second temperature utilizing said second power controlled thermal source (5) in said fusion chamber (3);

removing said quantity of gases from the pyrolysis chamber (2) utilizing a suction device (18);

directing said removed gases to a heat exchanger (6);

cooling said removed gases utilizing a water circulating via a pump (19) and utilizing air at an external environmental temperature with the aid of a radiator (20); wherein said heat exchanger (6) is configured to condensing oil and water from said removed gases utilizing said heat exchanger (6);

directing said condensed oil and water by gravity to a tank (21);

injecting said cooled and removed gases into an alkaline water containing tank (7), said alkaline water recirculated constantly with the aid of a pump (22) and filter (23) assembly and cooled in a radiator (24);

removing effluent gases from the alkaline water containing tank (7) utilizing a blower (9);

directing said effluent gases removed from said alkaline water containing tank (7) through an activated charcoal filter (8);

directing said effluent gases from said activated charcoal filter (8) to a combustor (10) having an electrical discharge generator, said electrical discharge generator configured for oxidizing fuel gases contained in said effluent gases; and after said fuel gases contained in said effluent gases are oxidized in said combustor (10), directing remaining effluent gases from said combustor (10) to a catalytic converter (11), said catalytic configured to ensure maximum reduction of NOx, CO and other gases being released to atmosphere through a chimney (12).

2. The process for the treatment of solid waste according to claim 1, further including the step of discharging a first liquefaction product of said treatment of solid waste through an opening (14) in the fusion chamber (3) of the reactor (1); collecting said discharged liquefaction product in a first crucible (15); and cooling and vitrifying said discharged first liquefaction product.

3. The process for the treatment of solid waste according to claim 2, further including the step of liquefying ferrous metals in the solid waste; collecting said liquefied ferrous metals at a bottom region of the reactor (1) as a second liquefaction product of said treatment of solid waste; and discharging said second liquefaction product through a bottom opening (16) in the fusion chamber (3) of the reactor (1) to a second crucible (17).

* * * * *